Patented Sept. 24, 1935

2,015,077

UNITED STATES PATENT OFFICE 2,015,077

ESTERS OF HIGHER ALIPHATIC ALCOHOLS

Walter E. Lawson, Wilmington, Del., assignor to E. I. du Pont de Nemours & Company, Wilmington, Del., a corporation of Delaware No Drawing. Application October 14, 1932, Serial No. 637,781

9 Claims. (Cl. 260—103)

This invention relates to new compositions of matter and more particularly it pertains to neutral carboxylic acid esters of branched carbon open-chain alcohols containing at least six carbon atoms.

An object of this invention is the preparation of neutral carboxylic acid esters of alcohols containing at least six carbon atoms and having a branched carbon open-chain. A still further object relates to the preparation of neutral polybasic acid esters of these alcohols. A still further object relates to the preparation of neutral monobasic acid esters of the said alcohols. Other objects of the invention will become apparent from the following description.

The novel esters to which the present invention pertains may be prepared by reacting polycarboxylic acids, monocarboxylic acids, or the anhydrides or chlorides of these acids with branched carbon open-chain alcohols containing at least six carbon atoms, or by reacting sodium salts of the acids with chlorides or other halide esters of the alcohols under conditions suitable for the production of the neutral esters or by ester interchange of these alcohols with esters of more volatile alcohols.

The following examples which are are illustrative only typify the methods used in the preparation of these esters:

Example 1

A mixture of alcohols boiling above 160° C., all of which have a branched carbon chain structure and which were obtained in the catalytic synthesis of methanol from CO and $H_2$, which mixture contains various amounts of the following alcohols: 2,4,dimethyl-1-pentanol, 4 - methyl - 1 - hexanol, 2,4,dimethyl-1-hexanol, 5-methyl-1-heptanol, 4,6,dimethyl - 1 - heptanol, 2,6,dimethyl - 1 - octanol, 2,4,6,trimethyl-1-octanol, 2 - ethyl-4-6-dimethyl-1-octanol, 2,4,6,trimethyl-1-decanol, 2,4,6,8, tetramethyl - 1 - decanol, 3 - methyl - 2 - hexanol, 3 - methyl - 2 - heptanol, 5 - methyl - 3 - octanol, 3 - ethyl-2-nonanol, etc. may be used in the preparation of a neutral phthalate as follows: A benzene solution of the above mixture of alcohols is mixed with an equimolar proportion of phthalic anhydride and is heated overnight in a steam bath. The solution is then cooled to 5 to 10° to precipitate unchanged phthalic anhydride which is filtered off. The benzene solution is then extracted with 10% sodium hydroxide solution in an amount equivalent to the phthalic anhydride which is reacted. After the alkali and benzene have been thoroughly mixed they are allowed to separate. The lower or aqueous layer contains the sodium salts of the acid phthalic ester of the primary alcohols contained in the original mixture, while the upper layer contains the secondary alcohols dissolved in benzene. The layers are separated, and mineral acid is added to the aqueous solution to convert the salts into the acid ester.

Butyl alcohol and the mixture of acid phthalic esters in equimolar proportions are dissolved in toluol with the addition of a small amount of sulfuric acid as a catalyst, and the mixture is heated in an apparatus designed to separate water from the distillate and to return the toluol to the reaction flask. Distillation is continued until the theoretical amount of water has been removed. The product is washed with sodium carbonate solution to remove the acid and is then refined by heating under vacuum in the presence of decolorizing carbon until the temperature reaches approximately 180° C. at 50 mm. The resultant product is a mixed butyl higher alcohol neutral ester of phthalic acid.

Example 2

A mixture containing 150 g. of phthalic anhydride, 300 g. of 2-methyl-pentanol-1, 200 g. of ethylene dichloride, and 5 g. of sulfuric acid is heated to boiling in the reflux distilling apparatus described in the preceding example; distillation being continued until the theoretical amount of water is separated. The product is refined as described in Example 1. The neutral ester thus obtained is very useful as a plasticizer for cellulose derivative compositions.

In place of the 2-methyl-pentanol-1 used in Example 2, one may substitute any of the branched carbon chain primary alcohols containing 6 to 14 carbon atoms, including 2,4,dimethyl-1-pentanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,trimethyl-1-decanol, 2,4,6,8,tetramethyl-1-decanol, or one may use a mixture of primary alcohols within this range. The products obtained are equally valuble as plasticizers for cellulose derivative compositions, e. g., cellulose nitrate and cellulose ether compositions. In the preparation of compounds similar to that described in Example 1, one may use any alcohol in place of butanol for the second step of the esterification, e. g., cyclohexanol, benzyl alcohol, hexahydrobenzyl alcohol, ethyl alcohol, octyl alcohol, decyl alcohol, monoalkyl and aryl ethers of glycols and polyglycols, dialkyl or diaryl ethers of glycerol, tetrahydrofurfuryl alcohols, or one may use secondary alcohols including those commonly found in higher alcohols from the methanol synthesis, such as 2-methyl-3-pentanol, 3-methyl-2-pentanol, 2,4,dimethyl-3-pentanol, 3,4,dimethyl-2-pentanol, 3-methyl-2-hexanol, 3-methyl-2-heptanol, 5-methyl-3-octanol, 3-ethyl-2-nonanol, etc. Any one of these secondary branched carbon chain alcohols may be substituted for the primary alcohols in the processes described in Examples 1 and 2.

In preparing the mixture of alcohols, the use of which is described in Example 1, by way of catalytic synthesis from carbon monoxide and hydrogen, this mixture of alcohols, due to the nature of the methanol synthesis reaction, contains in association therewith, numerous organic compounds other than alcohols, which for the most part contain oxygen in substantial amounts. This fact is readily recognized from the knowledge possessed by the art regarding the nature of the products produced during the methanol synthesis. The scope of the invention contemplates the use of these crude alcoholic mixtures in preparing esters of the character described.

The esters prepared as above described are all liquids varying from water-white to light amber in color, depending on their purity. They are high boiling and quite compatible with cellulose derivatives. In fact, they are more desirable for use with cellulose derivatives than similar esters prepared from straight chain normal alcohols of the same molecular weight. Although Examples 1 and 2 include only phthalic acid and phthalic anhydride, any polycarboxylic acid may be used including adipic, succinic, sebacic, citric, tartaric, trimesic, hexahydrophthalic, tetrahydrophthalic, quinolinic, etc.

The esters of the present invention may be used as plasticizers with cellulose derivatives such as cellulose nitrate, cellulose acetate, cellulose propionate, cellulose butyrate, cellulose acetobutyrate, cellulose nitroacetate, and other cellulose esters, ethyl cellulose, benzyl cellulose, and other cellulose ethers, with or without resins such as damar, ester gum, polyhydric alcohol-polybasic acid resins, and the like, and oils such as castor, China-wood, linseed, soya bean, cotton-seed oil, and the like, and pigments. Additional plasticizers known to the art such as triacetin, triphenyl phosphate, dibutyl phthalate, camphor, tricresyl phosphate, and the like, and solvents such as alcohols for cellulose nitrate compositions, acetone for cellulose acetate compositions, and toluol-alcohol for cellulose ethers may likewise be used.

The compounds herein disclosed may likewise be used as plasticizers and/or softeners for natural resins such as damar, sandarac, Congo, elemi, guaiac, kauri, rosin, etc., and synthetic resins such as polyhydric alcohol-polybasic acid resins (glyptals), phenol-aldehyde resins, urea-formaldehyde resins, vinyl resins, ester gums, etc. They may be used alone or in conjunction with other modifiers for the resin, such as waxes, etc.

The method of preparation of the compounds described above is capable of considerable variation. In the esterification reaction catalysts other than those mentioned may be used. Solvents other than those mentioned may be used to remove the water. In some cases solvents may be used without the use of a catalyst, and in still other cases neither solvent nor catalyst may be used. Also one may react a chloride or simple ester of the acid with the branched chain primary alcohols or the chloride of the alcohol with a salt of the acid under suitable conditions.

In addition to the neutral polybasic acid esters of the branched carbon open-chain alcohols referred to, the invention also contemplates the production of monobasic acid esters of these alcohols. One method of preparing this class of esters is disclosed in the following example:

*Example 3*

A mixture consisting of 43.4 parts coconut oil acids (which acids contain caproic, caprylic, capric, lauric, myristic, palmitic, and stearic acids) and 52 parts of the mixture of higher alcohols used in Example 1, 3.3 parts of toluene, and 0.1 part of sulfuric acid was heated in a distillation apparatus described in Example 1, and refined as in Example 1. The product consisted of a mixture of esters of the above acids and alcohols.

In the above example one may substitute any one of the pure primary or secondary branched carbon open-chain alcohols, contained in the mixture, for the mixture of alcohols or one may substitute any pure monocarboxylic acid for the coconut oil acid. Other acids which may be used include benzoylbenzoic acid, benzoic acid, hexahydrobenzoic acid, levulinic acid, furoic acid, and other aliphatic, aromatic, or heterocyclic acids.

The novel esters may be used in the preparation of all types of compositions containing cellulose esters and/or ethers. They may be used in the preparation of lacquers for coating metal and wood, dopes for coating fabrics, moisture proof lacquers for coating regenerated cellulose, and in plastic compositions to be used in the preparation of toiletware novelties, sheeting, rods, tubes, safety glass interlayer, etc.

The advantage of this invention is that it furnishes high boiling, water-resistant plasticizers for cellulose derivatives, and due to their low vapor pressure they give permanently flexible products having good durability. These compounds are characterized by being more satisfactory plasticizers for cellulose derivatives than compounds prepared from straight chain normal alcohols of the same molar weight. For example, the di-phthalate of 2,4-dimethyl hexanol-1 gives a good water-resistant coating when used as a plasticizer for cellulose nitrate, and the composition does not have a greasy feel, whereas di-n-octyl phthalate, although giving a good water-resistant composition when used as a plasticizer for cellulose nitrate, if used in sufficient quantity to flexibilize the film has a somewhat greasy feel. This is especially true of the esters of higher straight chain alcohols, such as lauryl esters.

The term "branched carbon open-chain alcohol" is intended to apply to open-chain alcohols, the carbinol group of which is attached to a branched carbon radical. The alcohols within this class with which the invention is most particularly concerned are those having from six to fourteen carbon atoms.

The above description and examples are to be taken as illustrative only and not as limiting the scope of the invention. Any modification or variation therefrom which conforms to the spirit of the invention is intended to be included within the scope of the claims.

I claim:

1. A neutral polycarboxylic acid ester of an alcohol having at least six carbon atoms, said alcohol being obtainable from the catalytic hydrogenation of carbon oxides and being taken from the class consisting of 2,4,dimethyl-1-pentanol, 4-methyl-1-hexanol, 2,4,dimethyl-1-hexanol, 5-methyl-1-heptanol, 4,6,dimethyl-1-heptanol, 2,6, dimethyl-1-octanol, 2,4,6,trimethyl-1-octanol, 2-ethyl-4-6-dimethyl-1-octanol, 2,4,6,trimethyl-1-decanol, 2,4,6,8,tetramethyl-1-decanol, 2-methyl-1-pentanol, 3-methyl - 2 - hexanol, 3-methyl-2-heptanol, 5-methyl-3-octanol, and 3-ethyl-2-nonanol.

2. The compound described in claim 1 in which the alcohol is a primary alcohol.

3. The compound described in claim 1 in which the polycarboxylic acid is phthalic acid.

4. A mixture of neutral phthalic esters obtainable by a process which comprises heating a mixture comprising phthalic anhydride and a mixture of alcohols having branched carbon open-chain radicals of at least six carbon atoms, said alcohol mixture being obtained by the hydrogenation of carbon oxide at an elevated temperature.

5. A mixture of neutral phthalic esters obtainable by a process which comprises heating a mixture comprising phthalic anhydride, mixed alcohols boiling above 160° C. and an inert organic solvent, said mixed alcohols being obtained by the hydrogenation of carbon oxide at an elevated temperature, recovering the mixed acid esters formed, and heating a mixture comprising the said mixed acid esters, butyl alcohol and an inert organic solvent, so as to obtain a mixture of neutral esters.

6. A mixture of neutral polycarboxylic acid esters obtainable by a process which comprises heating a mixture comprising a polycarboxylic acid and a mixture of alcohols having branched carbon open-chain radicals of at least six carbon atoms, said alcohol mixture being obtained by the catalytic hydrogenation of carbon oxides at an elevated temperature.

7. A mixture of neutral polycarboxylic acid esters obtainable by a process which comprises heating a mixture comprising a polycarboxylic acid, a mixture of alcohols boiling above 160° C., and an inert organic solvent, said alcohol mixture being obtained by the catalytic hydrogenation of carbon oxides at an elevated temperature, recovering the mixed acid esters formed, and heating a mixture comprising the said mixed acid esters, butyl alcohol, and an inert organic solvent so as to obtain a mixture of neutral esters.

8. Bis-2-methyl-n-amyl phthalate.

9. Bis-2,4-dimethyl-n-amyl phthalate.

WALTER E. LAWSON.